(12) United States Patent
Meunier (10) Patent No.: US 8,998,536 B2
(45) Date of Patent: Apr. 7, 2015

(54) METHOD AND DEVICE FOR MECHANIZED GEOPHONE DEPLOYMENT

(71) Applicant: CGGVeritas Services SA, Massy Cedex (FR)

(72) Inventor: Julien Meunier, Paris (FR)

(73) Assignee: CGGVeritas Services SA, Massy Cedex (FR)

( * ) Notice: Subject to any disclaimer, the term of this patent is extended or adjusted under 35 U.S.C. 154(b) by 60 days.

(21) Appl. No.: 13/845,624

(22) Filed: Mar. 18, 2013

(65) Prior Publication Data

US 2013/0251458 A1 Sep. 26, 2013

Related U.S. Application Data

(60) Provisional application No. 61/614,695, filed on Mar. 23, 2012.

(51) Int. Cl.
*E02F 5/10* (2006.01)
*G01V 1/16* (2006.01)

(52) U.S. Cl.
CPC ............... *G01V 1/168* (2013.01); *E02F 5/102* (2013.01); *G01V 1/166* (2013.01)

(58) Field of Classification Search
USPC .................... 405/180, 181, 183, 164, 157
See application file for complete search history.

(56) References Cited

U.S. PATENT DOCUMENTS

| | | | | | |
|---|---|---|---|---|---|
| 2,980,042 | A | * | 4/1961 | McCollum | 405/183 |
| 4,103,501 | A | * | 8/1978 | Laurent | 405/182 |
| 4,398,276 | A | * | 8/1983 | Kruppenbach | 405/154.1 |
| 7,066,687 | B2 | * | 6/2006 | Martin et al. | 405/157 |
| 2012/0069706 | A1 | * | 3/2012 | Goujon et al. | 405/174 |
| 2013/0115006 | A1 | * | 5/2013 | Oldervoll | 405/164 |

* cited by examiner

*Primary Examiner* — Frederick L Lagman
(74) *Attorney, Agent, or Firm* — Patent Portfolio Builders PLLC

(57) ABSTRACT

A method and a mechanized system for deploying plural geophones underground for collecting seismic data. The mechanized system includes a vehicle configured to travel above ground and having a storage area that stores the plural geophones; a digging mechanism attached to the vehicle and configured to dig a trench when in contact with the ground; and a damping mechanism attached to the vehicle and configured to hold a geophone behind the digging mechanism relative to a traveling direction (X) of the vehicle.

18 Claims, 9 Drawing Sheets

METHOD AND DEVICE FOR MECHANIZED GEOPHONE DEPLOYMENT

BACKGROUND

1. Technical Field

Embodiments of the subject matter disclosed herein generally relate to methods and systems for deploying geophones for collecting and seismic data and, more particularly, to mechanisms and techniques for mechanically deploying the geophones.

2. Discussion of the Background

Land seismic data acquisition and processing may be used to generate a profile (image) of the geophysical structure under the ground (subsurface). While this profile does not provide an accurate location for oil and gas reservoirs, it suggests, to those trained in the field, the presence or absence of such reservoirs. Thus, providing a high-resolution image of the subsurface is important, for example, to those who need to determine where oil and gas reservoirs are located.

Traditionally, a land seismic survey is performed in the following way. Plural geophones electrically connected to each other need to be deployed on the ground or below the ground. This process is very labor-intensive because thousands of geophones need to be deployed. Seismic personnel mark the desired locations of the geophones and manually dig a hole for each geophone. After the geophone is manually deployed into its corresponding hole, the seismic personnel manually cover the geophone with the dug dirt.

As this process may last for hours if not days, the seismic personnel become tired and may not compact the dirt on top of the geophone. Also, the bottom of the hole may not match the shape of the geophone. Thus, pockets of air may be left between the geophone and the dirt around it. These pockets will modify the velocity of the ground recorded by the geophone, i.e., will deteriorate the recorded signals.

After all the geophones have been deployed, one or more seismic sources are brought into the field and actuated to generate the seismic waves. The seismic waves propagate through the ground until they are reflected by various reflectors. The reflected waves propagate to the geophones, where a movement of the earth is recorded. However, if the coupling between the geophone and the dirt around it is not good, the recorded data is poor.

Figure 1:
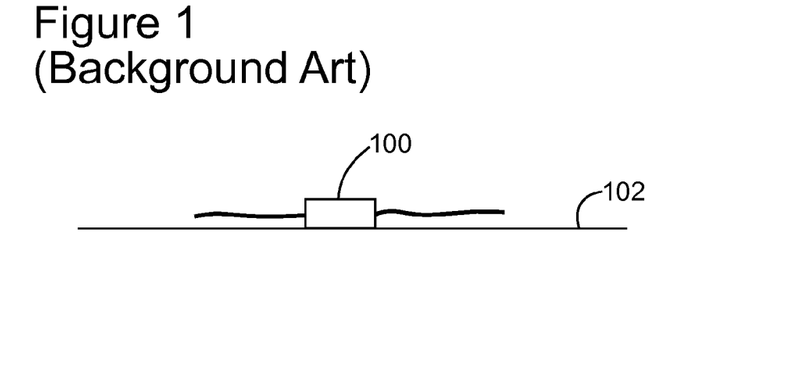
FIG. 1 illustrates a geophone deployed above ground.
Figure 2:
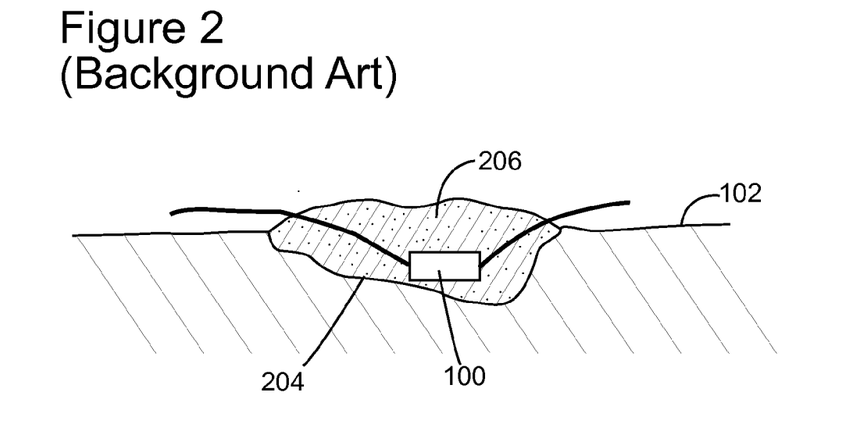
FIG. 2 illustrates a geophone manually deployed below ground.

The conventional geophones 100 are either placed on the ground 102 as shown in FIG. 1, or buried, manually, in a small hole 204 in the ground and then covered with dirt 206 for a better coupling. A geophone typically has a cylindrical shape and a small size, e.g., around 3 cm long and 2 cm in diameter. Thus, coupling between the geophone and the ground might be a problem. The coupling may be achieved by the weight of the geophone or by other means, e.g., a spike connected to the geophone and inserted into the ground. However, the coupling between the ground and geophone is not well understood. The geophone-ground coupling may be defined as the difference between the velocity measured by the geophone and the velocity of the ground without the geophone. This definition is appropriate for designing a geophone.

However, once the geophone is designed and needs to be deployed, the practicing geophysicist has to deal with the fact that the geophone may not be appropriately deployed. For example, the geophone may not be coupled "well" to its surroundings. In this situation, the above definition might not be appropriate. For this situation, those skilled in the art would consider that a bad geophone coupling refers to the difference between the velocity as measured by the badly planted geophone and the velocity as measured by the well-planted geophone.

Irrespective of the definition to be used, the ground-geophone coupling is a persistent problem in the field. Weight coupling generally is not well-behaved because the contact area between the geophone (or another sensor) and the ground is rough. Often, the only way to improve the coupling is to increase the mass of the geophone so that the contact with the ground becomes better (stronger coupling resulting in more regular contact area). In practice, geophones are kept lightweight because of weight limits imposed on transporting thousands of geophones. Thus, the requirements for (1) light weight and (2) a good coupling by weight work against each other.

Therefore, there is a need to improve the coupling of the geophone to the ground without increasing the weight of the geophone to improve the quality of recorded data.

SUMMARY OF THE INVENTION

According to an exemplary embodiment, there is a mechanized system for deploying plural geophones underground for collecting seismic data. The mechanized system includes a vehicle configured to travel above ground and having a storage area that stores the plural geophones, a digging mechanism attached to the vehicle and configured to dig a trench when in contact with the around, and a clamping mechanism attached to the vehicle and configured to hold a geophone behind the digging mechanism relative to a traveling direction of the vehicle. The clamping mechanism is configured to adjust a vertical position of the geophone synchronous with a vertical position of the digging mechanism.

According to another exemplary embodiment, there is a mechanized system for deploying plural geophones underground for collecting seismic data. The mechanized system includes a vehicle configured to travel above ground, a digging mechanism attached to the vehicle and configured to enter into the ground when actuated, and a damping mechanism attached to the vehicle and configured to hold a geophone behind the digging mechanism relative to a traveling direction of the vehicle.

In still another exemplary embodiment, there is a method for deploying plural geophones underground for collecting seismic data. The method includes driving a vehicle above ground, the vehicle having a storage area that stores the plural geophones; digging a trench with a digging mechanism attached to the vehicle; and releasing a geophone from a clamping mechanism attached to the vehicle. The clamping mechanism is configured to hold the geophone behind the digging mechanism relative to a traveling direction of the vehicle.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a land seismic system that includes geophones. However, the embodiments to be discussed next are not limited to geophones or to a land seismic system.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an exemplary embodiment, there is a mechanized system that deploys geophones underground. The mechanized system has a digging mechanism that forms a tunnel or a trench in the ground for accommodating the geophones. A clamping mechanism maintains a geophone behind the digging mechanism and releases the geophone at a desired position. The ground is minimally disturbed by the mechanized system because the size of the digging mechanism is small, i.e., comparable to the size of the geophone. Further, the process of deploying geophones is made more efficient and more reliable as better contact between the ground and the geophones is achieved. The mechanized system may be programmed to dig trenches or tunnels at any desired interval and in most types of soils.

Figure 3:
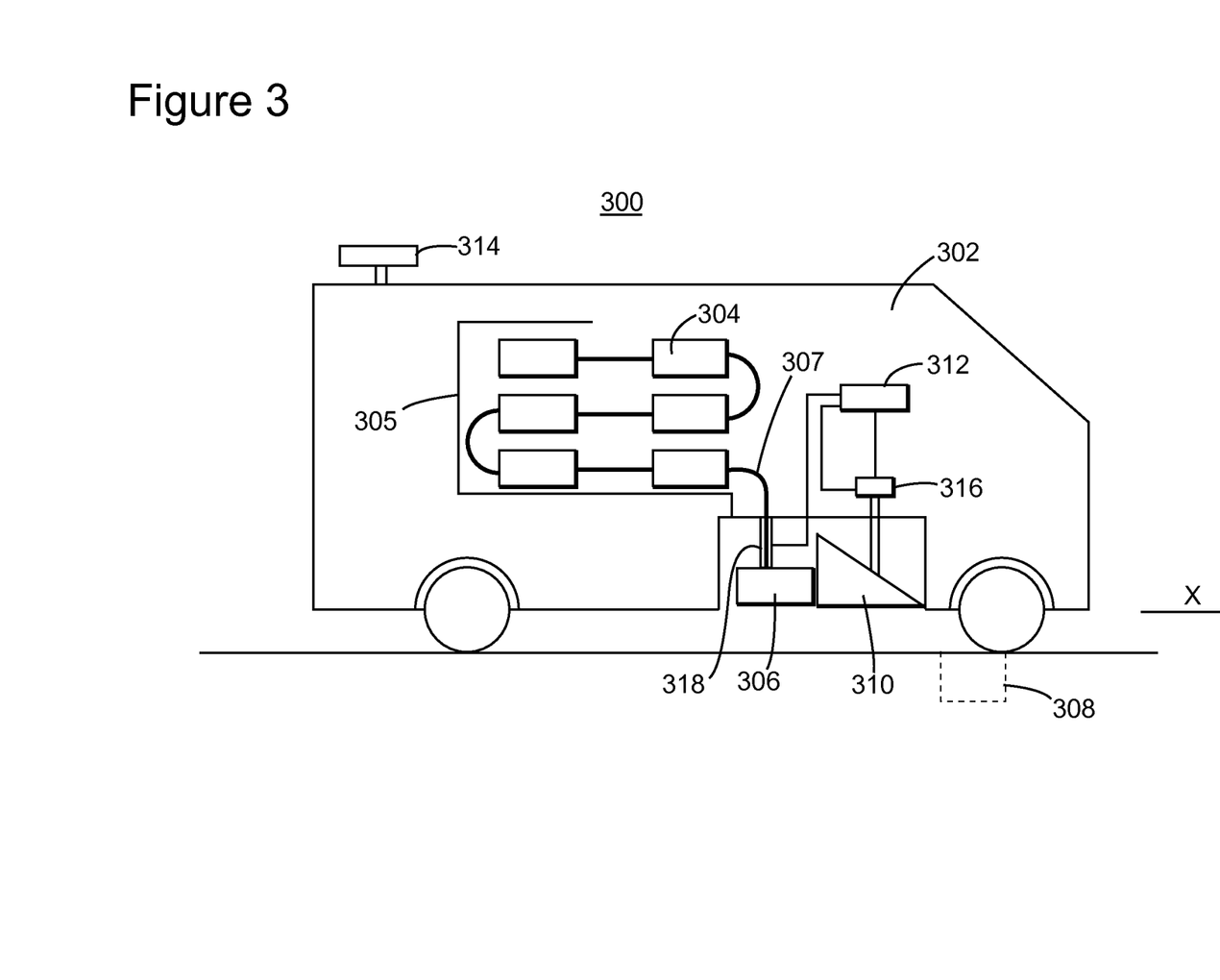
FIG. 3 is a schematic diagram of a mechanized system for deploying geophones below ground according to an exemplary embodiment.

According to an exemplary embodiment illustrated in FIG. 3, a system 300 includes a vehicle 302 that travels along a direction X and that stores plural geophones 304 in a storage area 305. It is noted that the geophones 304 are connected by an electrical cable 307 to each other. The vehicle 302 may be a truck on wheels or tracks and it is configured to release each geophone 304 at a corresponding desired position. For simplicity, in the following, discussed only is the release of a given geophone 306 at a desired underground position 308. In order to mechanically achieve the deployment of the geophone at the desired underground position 308, the vehicle 302 may use a digging mechanism 310, e.g., a plough.

The digging mechanism 310 may be attached in front, in the back, on the side, or underneath the vehicle. FIG. 3 is an exemplary embodiment in which the digging mechanism 310 is attached underneath the vehicle 302, between the wheels. A position of the digging mechanism 310 is controlled from a controller 312 installed on the vehicle 302. The controller 312 may be a computing device that may interact with an operator for adjusting the position of the digging mechanism 310 or may be controlled by software.

For example, the vehicle 302 may include a GPS system 314 for obtaining a position of the vehicle, and a previously entered route may reside in a memory of the controller 312 for driving the vehicle along the desired path. Further, the controller 312 may be programmed with a distance between adjacent geophones so that the controller 312 may, according to an exemplary embodiment, automatically drive the vehicle and deploy the geophones. The geophones may be fed to the plough in an automatic manner or by an operator present in the vehicle.

An actuation mechanism 316 may be provided on the vehicle for controlling an up- or down-moving position of the plough 310. The actuation mechanism may be electric, hydraulic, etc. Thus, the controller 312 may instruct the actuation mechanism 316 to start to make a trench just before position 308 for deploying the geophone 306. It is noted that a damping mechanism 318 (e.g., a damp, a hook, a suction device, etc.) may be attached to the vehicle and controlled by the controller 312 for holding and releasing the appropriate geophone at the desired position. Further, the clamping mechanism may be configured to hold the geophone at a vertical position that follows a vertical position of the digging mechanism 310.

Figure 4:
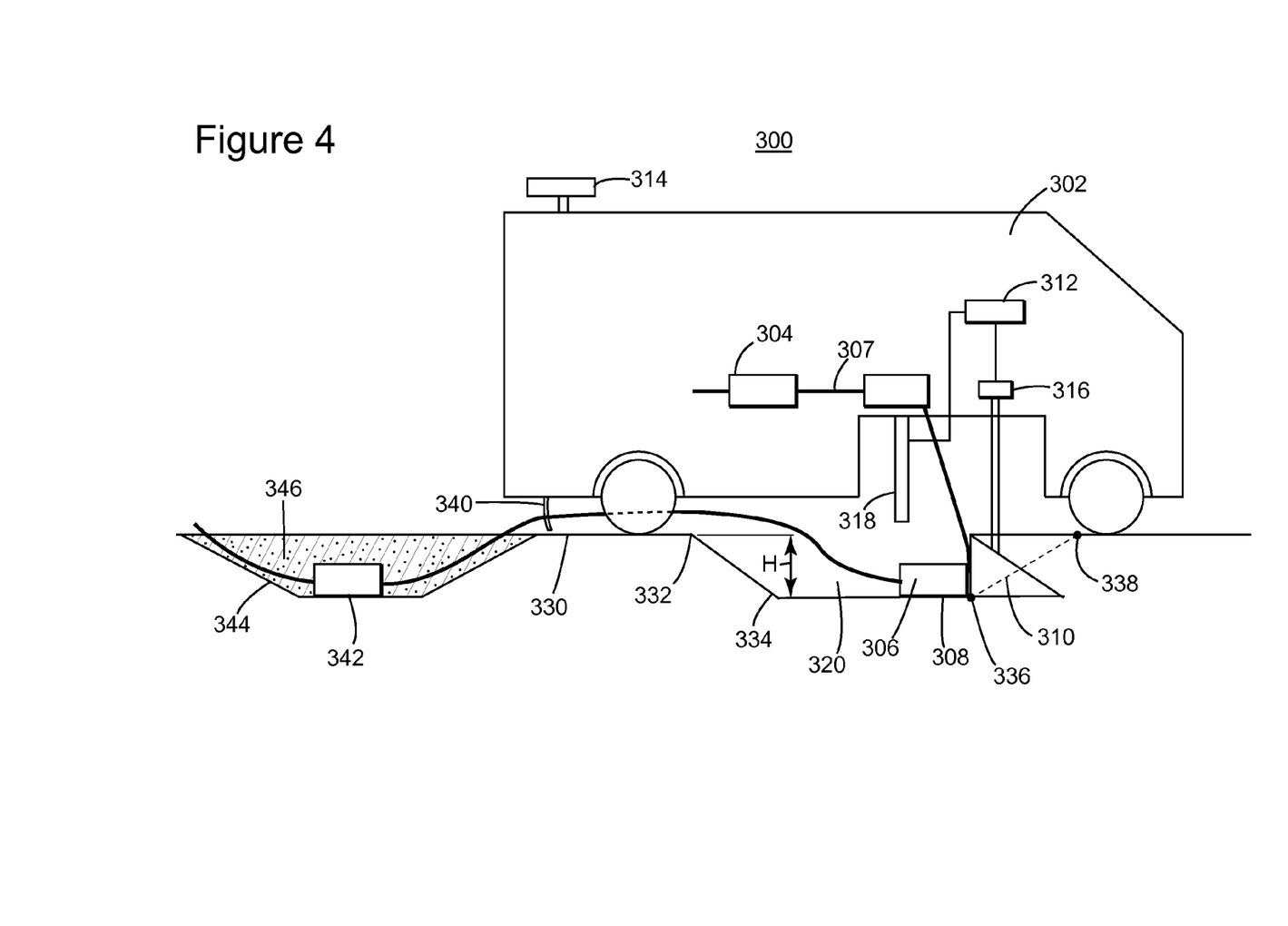
FIG. 4 is a schematic diagram of a mechanized system after at least one geophone has been deployed according to an exemplary embodiment.

FIG. 4 shows the vehicle 302 on top of the desired position 308 at which the geophone 306 is to be released. The digging mechanism 310 has been deployed into the ground 330 to create a trench 320. FIG. 4 shows a first position 332 at which the digging mechanism 310 has touched the ground 330, a second position 334 at which the digging mechanism 310 has arrived at a desired depth H at which to deploy the geophone 306, a third position 308 at which the geophone is released from the clamping mechanism 318, a fourth position 336 (which may coincide with the third position) at which the digging mechanism 310 is instructed to move toward the surface of the ground 330, and a fifth position 338 at which the digging mechanism 310 is expected to be completely off the ground.

In one exemplary embodiment, the dirt removed from the trench 320 by the digging mechanism 310 may be stored on the sides of the trench 320. For this situation, a covering mechanism 340, also attached to the vehicle 302, may be used to cover the deployed geophone 306 during the same pass of the vehicle 302. An already buried geophone 342 is also illustrated in FIG. 4. The geophone 342 has been deployed in a previous trench 344 and is already covered with dirt 346. The depth H may be about 4 cm, which is reduced comparative to a conventional deployment method.

Figure 5A:
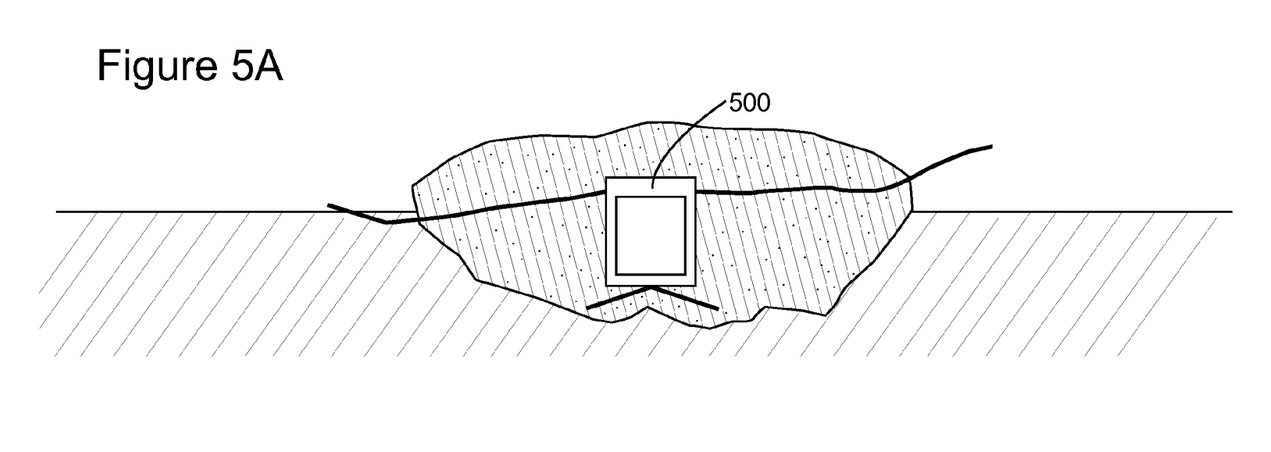
FIG. 5A is a schematic diagram of a manually deployed geophone.
Figure 5B:
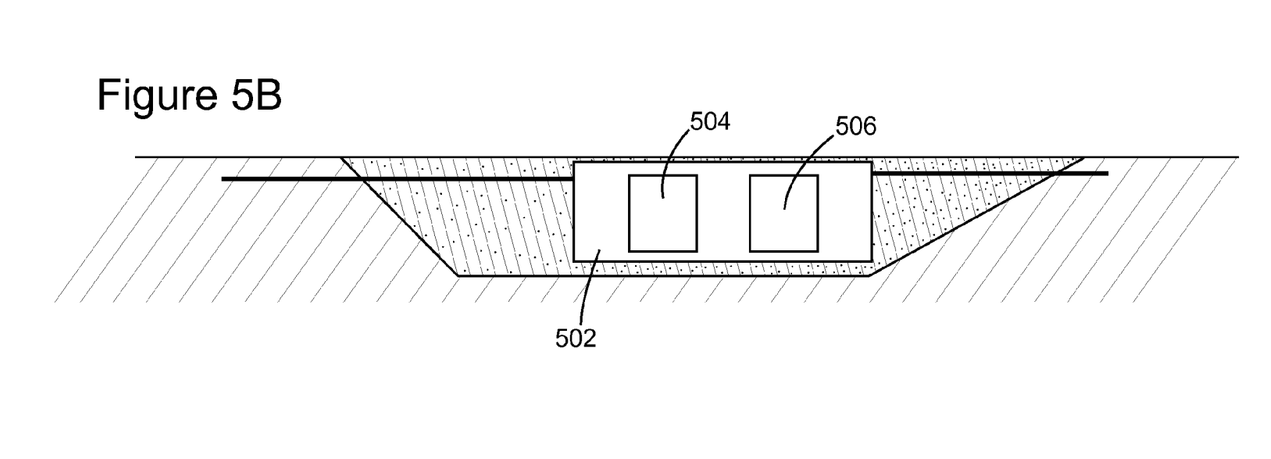
FIG. 5B is a schematic diagram of a mechanically deployed geophone according to an exemplary embodiment.

This mechanized deployment method enhances a contact (coupling) between the original soil and the geophone while maintaining the case of the geophone flush with the ground and minimizing the disturbance of the soil. In this regard, it is noted that the current technique of having a person dig a hole and then bury the geophone is prone to failures because the person becomes tired or disinterested with the tedious work of burying geophones in hard soil. From this perspective, FIG. 5A illustrates a geophone 500 buried by the traditional method, while FIG. 5B illustrates a geophone buried using the vehicle 302. Although FIG. 5B shows a casing 502 including two geophones 504 and 506, the method is applicable to a single geophone or more than two geophones. It is noted the better contact between the geophone bottom and the soil and the reduced disturbance of the soil for the mechanized method.

Figures 6A, 6B, 6C:
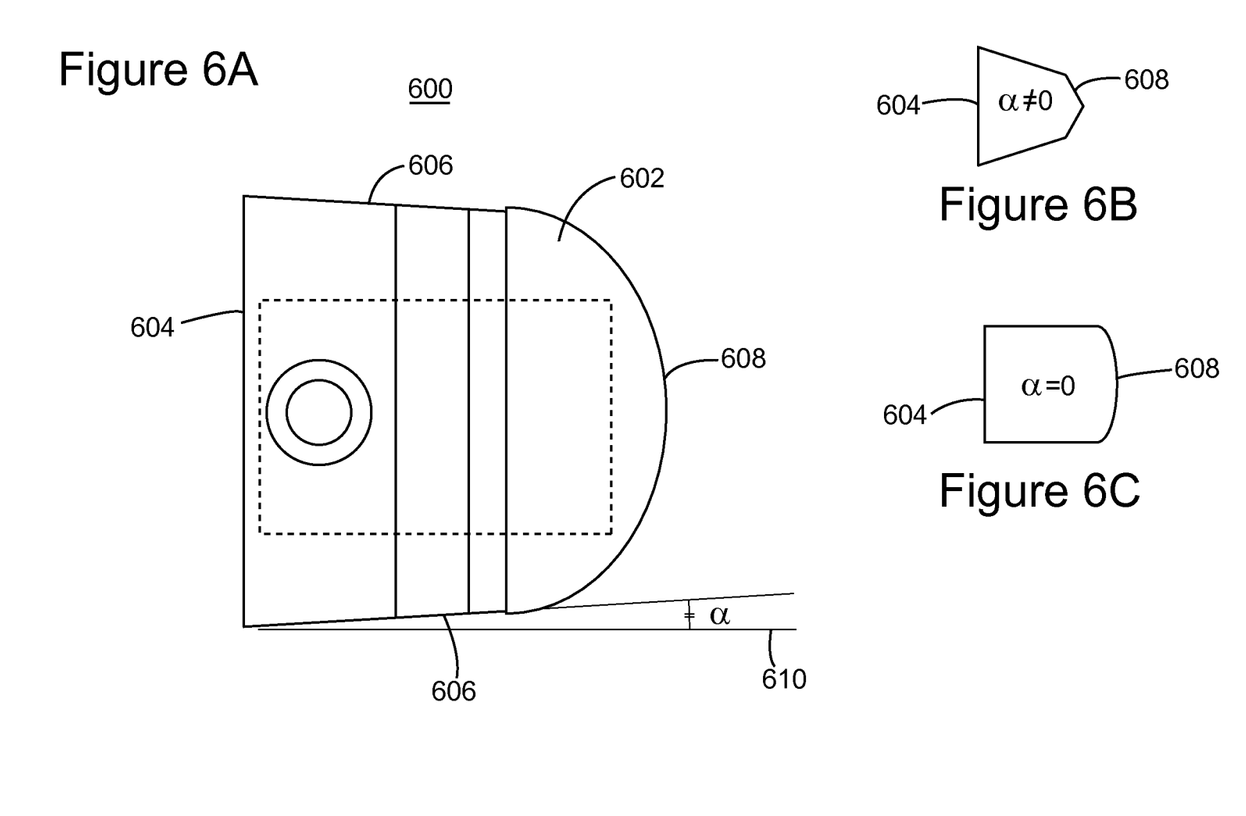
FIGS. 6A-C are schematic diagrams of various cross-sections of a geophone to be mechanically deployed underground according to various exemplary embodiments.

A profile of a case of a geophone 600 to be deployed based on the above technique is shown, according to an exemplary embodiment, in FIG. 6A. It is noted a profile of the case 602, i.e., a flat top surface 604, flat lateral sides 606 and a curved bottom surface 608. It is also noted that the flat lateral sides 606 form an angle α with a vertical line 610. FIG. 6A shows the geophone 600 sitting on a side 606. Other shapes are possible for the casing of the geophone as shown in FIG. 6B (triangular shape for the bottom surface) and FIG. 6C (angle α being zero).

Figure 7:
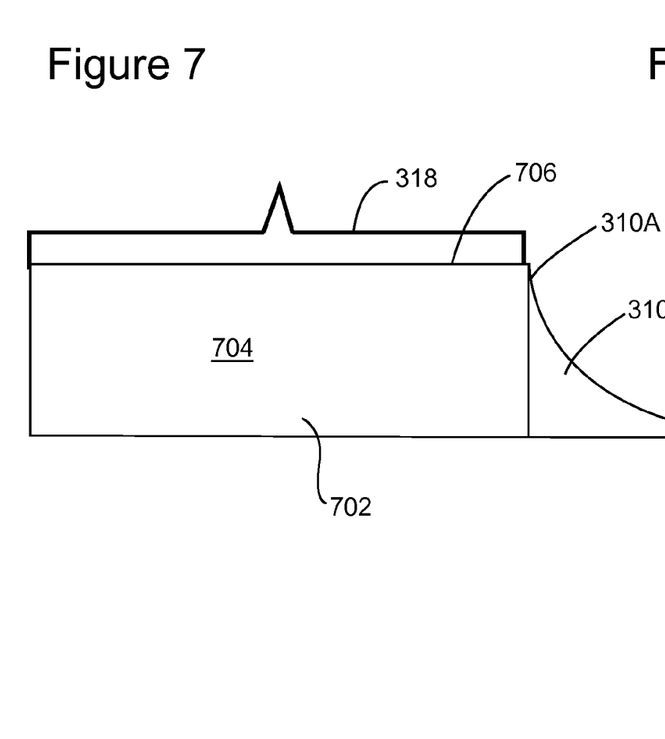
FIG. 7 is a schematic diagram of a geophone provided behind a digging mechanism according to an exemplary embodiment.
Figure 8:
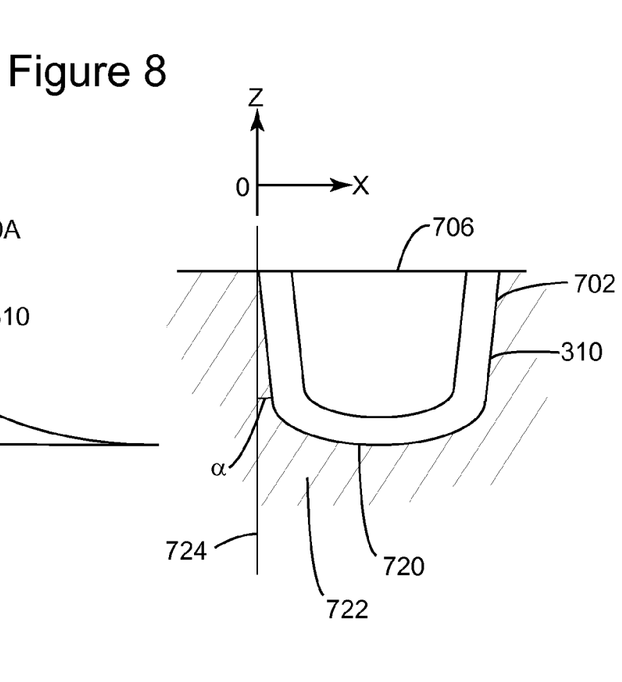
FIG. 8 is a schematic diagram of a cross-section of a geophone after being placed in a trench according to an exemplary embodiment.

Various relations between the shape of the geophone and the shape of the digging mechanism, and also between the shape of the geophone and the shape of the trench, are now discussed with reference to FIGS. 7 and 8. FIG. 7 shows a casing 702 of a geophone 704 being held next to the digging mechanism 310 (described in FIGS. 3 and 4) and the clamping mechanism 318 holding the geophone 704. In this embodiment, a transversal cross-section of the digging mechanism 310 and a transversal cross-section of the casing 702 are substantially identical, as shown in FIG. 8. It is noted that the top flat side 706 of the casing 702 is flush with a top portion 310A of the digging mechanism 310. In one embodiment, the top portion 310A of the digging mechanism 310 is taller than the casing 702.

By having the transversal cross-sections of the digging mechanism 310 and the casing 702 of the geophone 704 substantially identical (i.e., within normal manufacturing tolerances), a trench 720 formed in the ground 722 by the digging mechanism 310 fits tightly around the sides and bottom of the geophone casing 702. The angle α between the side of the casing 702 or the side of the trench 720 and a vertical line 724 (perpendicular to the around 722) is a small angle, e.g., between zero and 30 degrees, more preferably, between 3 and 7 degrees. This small angle ensures a downward coupling force between the ground and the geophone. The vertical line 724 may extend along a Z axis of a system of reference XOZ.

Figure 9:
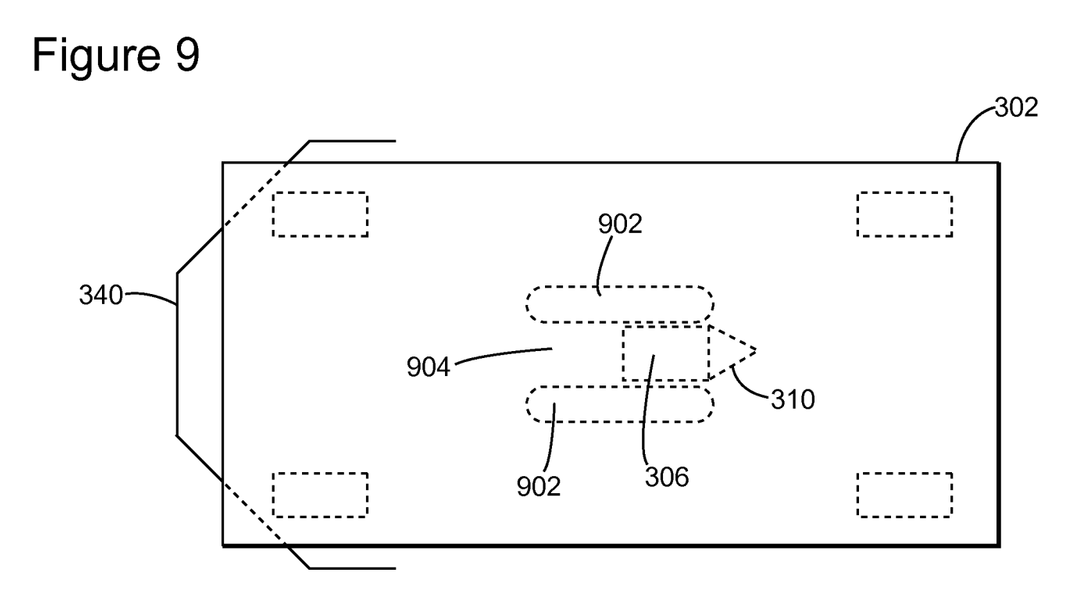
FIG. 9 is a top view of a mechanized system for deploying geophones according to an exemplary embodiment.

The digging mechanism 310 noted above has been described as removing the dirt from the trench and storing the removed dirt 902 on the sides of the trench 904 as shown in FIG. 9. FIG. 9 also shows the covering mechanism 340 approaching the removed dirt 902 for covering the geophone 306. Another approach is also possible in which the dirt is not removed from the trench, but rather the dirt is pushed on the sides of the digging mechanism (e.g., compacted) for making a tunnel for the geophone 306. In this case, the digging mechanism may have a bullet shape to not remove the dirt. In this regard, it is noted that the dimensions of the geophone (and implicitly of the digging mechanism) are small, e.g., a length of no more than 6 cm and a width of no more than 5 cm. Thus, in this application, there is no need for the covering mechanism because the dirt is not removed from the trench and the geophone 306 is very tightly implanted into the ground.

Figure 10:
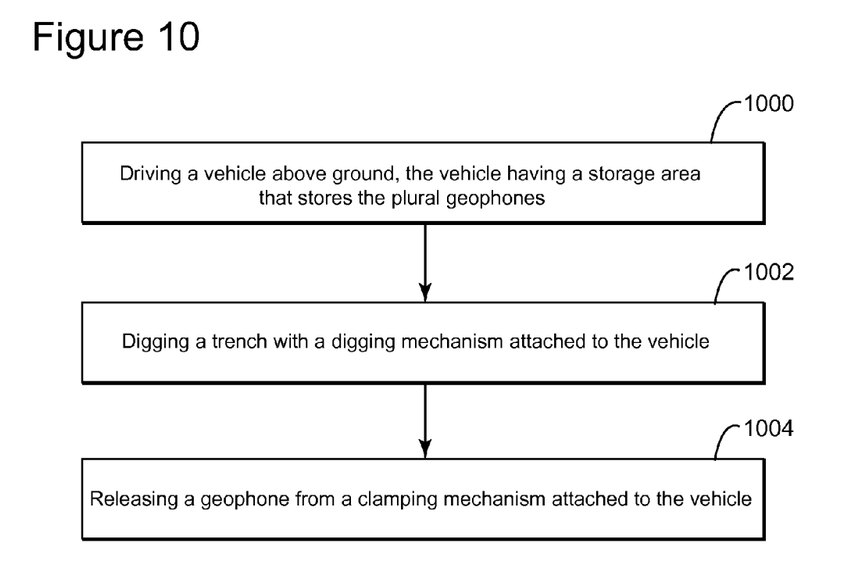
FIG. 10 is a flowchart of a method for mechanically deploying geophones according to an exemplary embodiment.

The above-described system may be used in the field to mechanically deploy plural geophones and remove the imperfections associated with human deployment discussed in the Background section. In this regard, a method for deploying plural geophones (304, 306) underground for collecting seismic data is now discussed with regard to FIG. 10. The method includes a step 1000 of driving a vehicle above ground, the vehicle having a storage area that stores the plural geophones; a step 1002 of digging a trench with a digging mechanism attached to the vehicle; and a step 1004 of releasing a geophone from a clamping mechanism attached to the vehicle. The clamping mechanism is configured to hold the geophone behind the digging mechanism relative to a traveling direction (X) of the vehicle.

Figure 11:
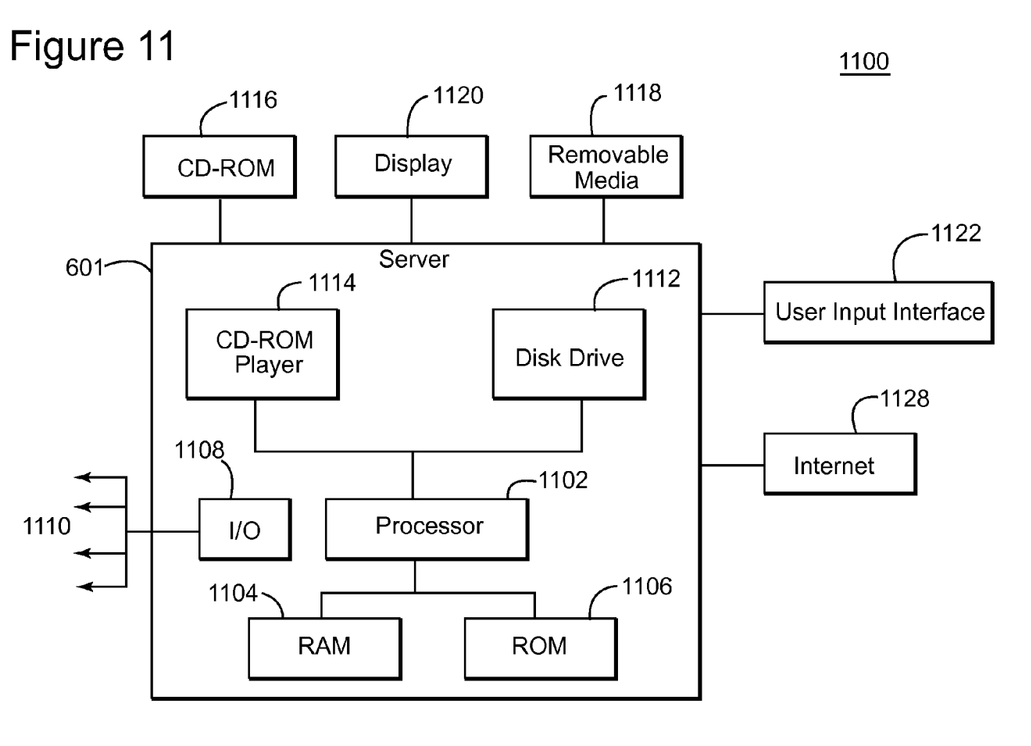
FIG. 11 is a schematic diagram of a computing device capable of implementing one or more of the methods discussed in the exemplary embodiments.

The above method and others may be implemented in a computing system specifically configured to drive the digging mechanism, the damping mechanism, the covering mechanism and/or the vehicle. An example of a representative computing system capable of carrying out operations in accordance with the exemplary embodiments is illustrated in FIG. 11. Hardware, firmware, software or a combination thereof may be used to perform the various steps and operations described herein. The computing system may be part of the controller 312.

The exemplary computing system 1100 suitable for performing the activities described in the exemplary embodiments may include server 1101. Such a server 1101 may include a central processor (CPU) 1102 coupled to a random access memory (RAM) 1104 and to a read-only memory (ROM) 1106. The ROM 1106 may also be other types of storage media to store programs, such as programmable ROM (PROM), erasable PROM (EPROM), etc. The processor 1102 may communicate with other internal and external components through input/output (I/O) circuitry 1108 and bussing 1110, to provide control signals and the like. The processor 1102 carries out a variety of functions as are known in the art, as dictated by software and/or firmware instructions.

The server 1101 may also include one or more data storage devices, including a hard drive 1112, CD-ROM drives 1114, and other hardware capable of reading and/or storing information such as DVD, etc. In one embodiment, software for carrying out the above-discussed steps may be stored and distributed on a CD-ROM 1116, removable memory device 1118 or other form of media capable of portably storing information. These storage media may be inserted into, and read by, devices such as the CD-ROM drive 1114, the disk drive 1112, etc. The server 1101 may be coupled to a display 1120, which may be any type of known display or presentation screen, such as LCD. LED displays, plasma display, cathode ray tubes (CRT), etc. A user input interface 1122 is provided, including one or more user interface mechanisms such as a mouse, keyboard, microphone, touch pad, touch screen, voice-recognition system, etc.

The server 1101 may be coupled to other computing devices, such as the landline and/or wireless terminals via a network. The server may be part of a larger network configuration as in a global area network (GAN) such as the Internet 1128, which allows ultimate connection to the various landline and/or mobile client devices. The computing device may be implemented on a vehicle that performs a land seismic survey.

The disclosed exemplary embodiments provide a system and a method for mechanically deploying geophones. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A mechanized system for deploying plural geophones underground for collecting seismic data, the mechanized system comprising:
    a vehicle configured to travel above ground and having a storage area that stores the plural geophones;
    a digging mechanism attached to the vehicle and configured to dig a trench when in contact with the ground; and
    a clamping mechanism attached to the vehicle and configured to hold a geophone behind the digging mechanism relative to a traveling direction (X) of the vehicle,
    wherein the clamping mechanism is configured to adjust a vertical position of the geophone in synchronism with a vertical position of the digging mechanism.

2. The mechanized system of claim 1, wherein a cross-section of the digging mechanism is substantially identical with a cross-sectional of the geophone so that the geophone fits tightly into the trench formed by the digging mechanism.

3. The mechanized system of claim 1, wherein the clamping mechanism is configured to release the geophone at a desired position so that the geophone remains into the trench when the vehicles moves away from the trench.

4. The mechanized system of claim 1, wherein the digging mechanism is configured to remove dirt from the trench and store the dirt on sides of the trench.

5. The mechanized system of claim 4, further comprising:
    a covering mechanism configured to cover the geophone with the dirt removed by the digging mechanism.

6. The mechanized system of claim 1, wherein the digging mechanism is a plough.

7. The mechanized system of claim 1, further comprising:
    an actuation mechanism connected between the vehicle and the digging mechanism and configured to lower or raise the digging mechanism for forming trenches at desired positions.

8. The mechanized system of claim 7, further comprising:
    a controller connected to the actuation mechanism and to the clamping mechanism and configured to control when to start digging the trench, when to release the geophone into the trench and when to end digging the trench.

9. The mechanized system of claim 8, wherein the controller is configured to instruct the actuation mechanism and the clamping mechanism to dig multiple trenches and to release multiple geophones, at least one per trench.

10. The mechanized system of claim 1, wherein an electric cable connects the geophone to a next geophone.

11. The mechanized system of claim 1, wherein the geophone has a casing having a top flat surface, flat sides and a curved bottom surface and the digging mechanism has a similar profile so that the formed trench has a curved bottom and flat sides.

12. The mechanized system of claim 11, wherein the flat sides of the casing form an angle $\alpha$ with a line perpendicular to the top surface of the casing.

13. The mechanized system of claim 12, wherein the angle $\alpha$ is between 3 and 7 degrees.

14. A mechanized system for deploying plural geophones underground for collecting seismic data, the mechanized system comprising:
    a vehicle configured to travel above ground;
    a digging mechanism attached to the vehicle and configured to enter into the ground when actuated;
    a clamping mechanism attached to the vehicle and configured to hold a geophone behind the digging mechanism relative to a traveling direction (X) of the vehicle;
    an actuation mechanism connected to the digging mechanism and configured to lower or raise the digging mechanism for forming tunnels at desired positions; and
    a controller connected to the actuation mechanism and the clamping mechanism and configured to control when to start the tunnel, when to release the geophone into the tunnel and when to end the tunnel,
    wherein the controller is configured to instruct the actuation mechanism and the clamping mechanism to dig multiple tunnels and to release multiple geophones, at least one per tunnel.

15. The mechanized system of claim 14, wherein a cross-section of the digging mechanism is substantially identical with a cross-sectional of the geophone so that the geophone fits tightly into the trench formed by the digging mechanism.

16. The mechanized system of claim 14, wherein the clamping mechanism is configured to release the geophone at a desired position so that the geophone remains into the trench when the vehicles moves away from the trench.

17. The mechanized system of claim 14, wherein the digging mechanism is configured to compact the ground to make a tunnel for deploying the geophone.

18. A method for deploying plural geophones underground for collecting seismic data, the method comprising:
    driving a vehicle above ground, the vehicle having a storage area that stores the plural geophones;
    digging a trench with a digging mechanism attached to the vehicle; and
    releasing a geophone from a clamping mechanism attached to the vehicle, wherein the clamping mechanism is configured to hold the geophone behind the digging mechanism relative to a traveling direction (X) of the vehicle,
    wherein the clamping mechanism is configured to adjust a vertical position of the geophone in synchronism with a vertical position of the digging mechanism.

* * * * *

UNITED STATES PATENT AND TRADEMARK OFFICE
CERTIFICATE OF CORRECTION

| | | |
|---|---|---|
| PATENT NO. | : 8,998,536 B2 | Page 1 of 1 |
| APPLICATION NO. | : 13/845624 | |
| DATED | : April 7, 2015 | |
| INVENTOR(S) | : Meunier | |

It is certified that error appears in the above-identified patent and that said Letters Patent is hereby corrected as shown below:

TITLE PAGE

Item (57), under "ABSTRACT", in Column 2, Line 7, delete "damping" and insert -- clamping --, therefor.

IN THE SPECIFICATION

In Column 1, Line 9, delete "collecting and" and insert -- collecting land --, therefor.

In Column 1, Line 52, delete "Thus," and insert -- Thus, a --, therefor.

In Column 2, Line 29, delete "around," and insert -- ground, --, therefor.

In Column 2, Line 41, delete "damping" and insert -- clamping --, therefor.

In Column 4, Line 32, delete "damping" and insert -- clamping --, therefor.

In Column 4, Line 32, delete "a damp," and insert -- a clamp, --, therefor.

In Column 5, Line 43, delete "around 722)" and insert -- ground 722) --, therefor.

In Column 6, Line 14, delete "damping" and insert -- clamping --, therefor.

In Column 6, Line 47, delete "LCD." and insert -- LCD, --, therefor.

Signed and Sealed this
Twelfth Day of July, 2016

Michelle K. Lee
*Director of the United States Patent and Trademark Office*